United States Patent [19]

Fujioka et al.

[11] Patent Number: 4,651,266

[45] Date of Patent: Mar. 17, 1987

[54] HIGH-FREQUENCY NOISE ABSORBING CIRCUIT

[75] Inventors: Yoshiki Fujioka, Higashiyamato; Tatsuo Shinohara, Hino, both of Japan

[73] Assignee: Fanuc Ltd, Minamitsuru, Japan

[21] Appl. No.: 778,188

[22] PCT Filed: Feb. 16, 1985

[86] PCT No.: PCT/JP85/00065
§ 371 Date: Sep. 17, 1985
§ 102(e) Date: Sep. 17, 1985

[87] PCT Pub. No.: WO85/03813
PCT Pub. Date: Aug. 29, 1985

[51] Int. Cl.$^4$ .............................................. H02M 1/12
[52] U.S. Cl. ...................................... 363/39; 363/35; 363/37; 363/51; 363/126
[58] Field of Search ................... 363/35, 37, 39, 47, 363/48, 51, 126; 333/12, 177

[56] References Cited

U.S. PATENT DOCUMENTS 3,683,271 8/1972 Kobayashi ....................... 333/177

FOREIGN PATENT DOCUMENTS 104034 12/1973 Japan .
106555 8/1977 Japan .
23246 3/1978 Japan .
71277 5/1982 Japan .
208875 12/1982 Japan .

Primary Examiner—Patrick R. Salce
Assistant Examiner—Anita M. Ault
Attorney, Agent, or Firm—Staas & Halsey

[57] ABSTRACT

A high-frequency noise absorbing circuit in a control circuit of a loading device having a power supply section (I), a converter circuit section (II), a DC link section (III) and an inverter circuit section IV, with capacitors C3 and C4 being connected between ground and respective positive and negative terminals of the DC link section (III) and a smoothing capacitor C1 connected between the positive and negative terminals of the DC link section (III). The high-frequency noise absorbing circuit includes a zero-phase reactor L1 arranged in the power supply section (I). Further, the high-frequency noise absorbing circuit includes a zero-phase reactor L1 arranged in the power supply section (I), and capacitors C5 arranged between the lines of the power supply section (I).

7 Claims, 8 Drawing Figures

HIGH-FREQUENCY NOISE ABSORBING CIRCUIT

TECHNICAL FIELD

This invention relates to a high-frequency noise absorbing circuit and, more particularly, to a high-frequency noise absorbing circuit suitable for reducing high-frequency noise that propagates through an AC power supply line of a drive unit during variable speed drive of an induction motor.

BACKGROUND ART

In an induction motor control circuit or the like for performing a DC→AC conversion by utilizing the switching of a transistor in a switching regulator, transistor inverter or the like, voltage undergoes a sudden change owing to the switching of the transistor and a high-frequency current is generated by the integrated component (dv/dt) of the voltage. This high-frequency current flows through the stray capacitance of the loading device (namely the capacitance between the device and earth) and through the capacitance between a power supply cable and earth, so that the power supply cable acts as an antenna and emits radio waves. These radio waves have an influence upon the carrier waves (500 KHz–2 MHz) of an AM radio and are a source of such noise as radio noise. It is desired that radio wave trouble caused by such transistor switching be prevented.

If an insulating transformer serving as means for countering radio wave trouble is provided on the side of the loading device, the emission of radio waves from the power supply cable can be prevented since the high-frequency current is not transmitted to the exterior of the loading device. However, an insulating transformer is disadvantageous in that it is costly, complicates the construction of the apparatus and results in an apparatus of larger size.

There has recently been proposed a noise absorbing circuit in which a low-pass filter comprising a capacitor and an AC reactor (inductance component) is arranged on the input side to cut the high-frequency current from a load circuit inside the apparatus so that this current is not transmitted to the power supply cable side.

According to such an arrangement, cutting of the high-frequency current caused by transistor switching can be achieved without using a transformer. Installation of a leakage current breaker is mandatory from the viewpoint of safety and prevention of fire caused by leakage current. The leakage current breaker is actuated when current exceeds 30 mA.

Consequently, when the low-pass filter is provided, there is the danger that a leakage current at the power supply frequency will be produced, thereby actuating the leakage current breaker. Further, though there is little risk of erroneous operation in a case where one apparatus is connected to one leakage current breaker, ordinarily a plurality of apparatus are connected to a single leakage current breaker. In such case, a problem arises wherein the leakage current breaker malfunctions due to a low-pass filter leakage current having a power supply frequency component. Thus, the state of the art is such that technical difficulties are encountered in fabricating a satisfactory high-frequency noise absorbing circuit.

DISCLOSURE OF THE INVENTION

In view of the foregoing, an object of the present invention is to provide an inexpensive high-frequency noise absorbing circuit in a control circuit of a loading device, which noise absorbing circuit does not employ an insulating transformer while suppressing an increase in leakage current caused by a low-pass filter, thereby enabling absorption of high-frequency noise to be satisfactorily performed.

According to the present invention, there is provided a high-frequency noise absorbing circuit in which capacitors are connected between ground and respective positive and negative terminals of a DC link section in a control circuit of a loading device having a power supply section, converter circuit section, the DC link section and an inverter circuit section.

Further, according to the present invention, there is provided a high-frequency noise absorbing circuit in which a zero-phase reactor is arranged in the power supply section.

Further, according to the present invention, there is provided a high-frequency noise absorbing circuit in which a zero-phase reactor is arranged in the power supply section and capacitors are arranged between the lines of the power supply section.

By providing the present invention, an inexpensive high-frequency noise absorbing circuit is obtained in which high-frequency current can be effectively absorbed without using an insulating transformer as in the prior art.

Other objects and features of the present invention will become clear from the following description.

BRIEF DESCRIPTION OF THE DRAWINGS

FIGS. 4 through 6 illustrate yet another embodiment of a zero-phase reactor, in which FIG. 4 is a view for describing the construction and princple of the reactor, FIG. 5 is a front view of the same and FIG. 6 is a side view thereof.

BEST MODE FOR CARRYING OUT THE INVENTION

The present invention will now be described in detail in conjunction with the illustrated embodiments.

Figure 1:
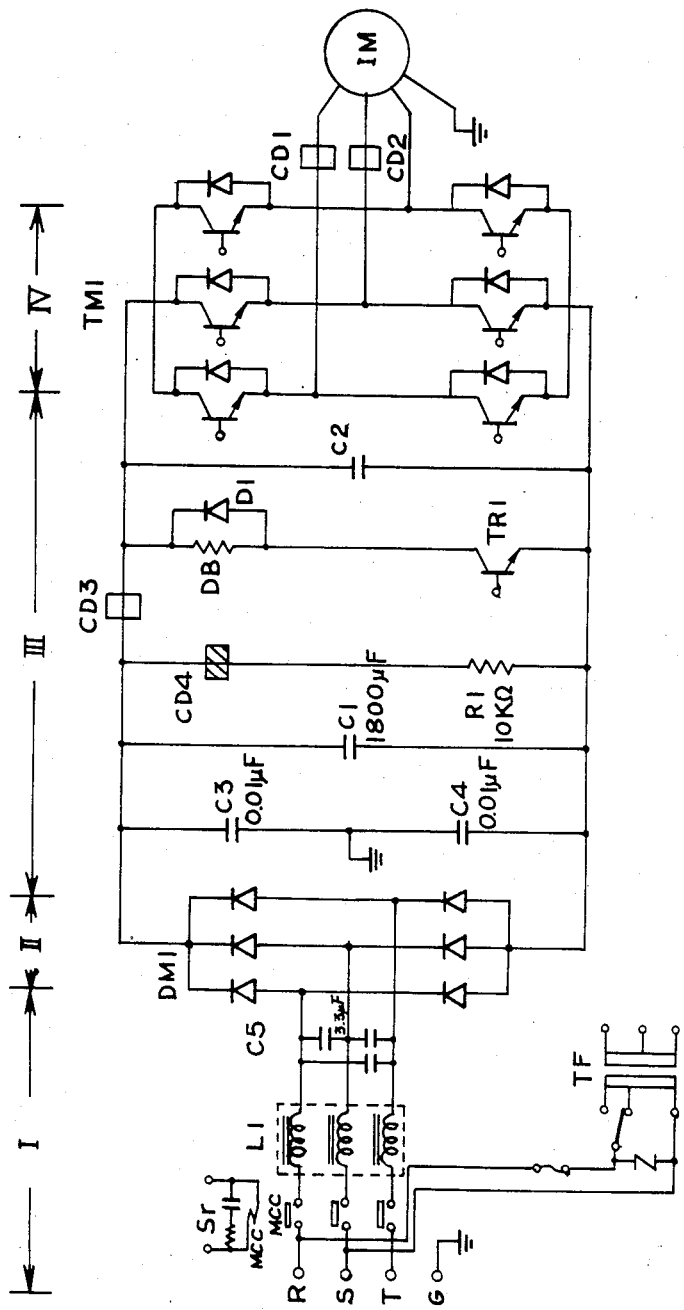
FIG. 1 is a circuit diagram of a variable-speed control circuit of an induction motor equipped with a high-frequency noise absorbing circuit according to an embodiment of the present invention.

FIG. 1 is a circuit diagram of a variable-speed control circuit of an induction motor equipped with a high-frequency noise absorbing circuit according to an embodiment of the present invention. The control circuit comprises a power supply section I, converter circuit section II, DC link section III and inverter circuit section IV. The power supply section I has an electromagnetic contactor MCC connected to three-phase input terminals R, S, T of an AC power supply, an AC reactor L1 connected to the electromagnetic contactor MCC, second capacitors C5 connected between the three-phase AC lines, and a transformer TF for AC power supply control. The converter circuit section II is composed of a diode module comprising a plurality of diodes. The DC link section III is composed of first capacitors C3, C4 connected between positive and negative termnals and ground, respectively, a smoothing capacitor C1 connected between the positive and negative terminals, a voltage detecting device connected between the positive and negative terminals and comprising a DC link section voltage detector CD4 and a discharge resistor R1, a DC link section current detector CD3, a discharge resistor DB connected between the positive and negative terminals, a surge absorbing diode D1, a transistor TR1 for effecting regeneration when the voltage of the DC link section exceeds the input voltage, and a surge absorbing capacitor C2 connected between the positive and negative terminals. The first capacitors C3, C4 are set to a capacitance of, e.g., 0.01 $\mu$F. The discharge resistor R1 has its resistance value set to, e.g., 10 K$\Omega$, and its output set to 20 W.

The inverter circuit section IV is composed of a transistor module TM1 comprising a plurality of transistors and diodes. The transistors are turned on and off by control pulses from an ordinary pulse width modulation control circuit, not shown, thereby controlling the frequency of an induction motor IM.

In the drawing, CD1, CD2 represent current detectors of the induction motor IM.

Figure 2:
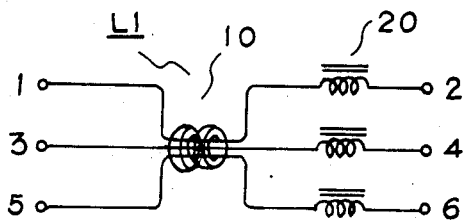
FIGS. 2(a) and 2(b) are explanatory views illustrating an embodiment of a zero-phase reactor used in a high-frequency noise absorbing circuit according to the present invention.

Next, an embodiment of the zero-phase reactor L1 will be described in conjuction with FIGS. 2(a) and 2(b). FIG. 2(a) is a detailed circuit diagram of the zero-phase reactor, and FIG. 2(b) is a perspective view showing the construction of the zero-phase reactor.

First, the zero phase refers to the sum of the three phases of the three-phase alternating current. Ordinarily, the three phases are in equilibrium, so that the zero phase, namely the sum of the three phases, is zero. When the three phases attain a state of non-equilibrium, however, the zero phase takes on a certain value. As is clear from the circuit diagrams of FIGS. 2(a) and 2(b), the zero-phase reactor L1, if considered functionally in disassembled form, comprises a zero-phase reactor section 10 in which three power supply lines 1, 3, 5 are all surrounded by a cut core 7, and an AC line reactor section 20 having a cut core 8 and three windings. Preferably, the inductance of the AC line reactor section 20 is 0.1-0.2 mH, and the inductance of the zero-phase reactor section 10 is 1-2 mH. The second capacitors C5 are connected to the output lines 2, 4, 6 of the zero-phase reactor L1.

The operation of the high-frequency noise absorbing circuit in accordance with the present invention will now be described.

When a high-frequency current is generated by switching of the transistor module TM1, the high-frequency current propagates through the power supply lines toward the power supply side. Since the first capacitors C3, C4 are provided between the terminals and ground in the DC link section III, the high-frequency current is capable of escaping to ground. Though the values of the first capacitors C3, C4 are 0.1 $\mu$F in the prior art, this is made 0.01 $\mu$F in the present embodiment in order to suppress the leakage current traveling to ground to less than 1 mA. The high-frequency current, absorbed to some extent by the first capacitors C3, C4, reaches the three-phase power supply section of the diode module DM1. However, in the present embodiment, the capacitors C5 are provided between the three-phase lines and, moreover, the above-mentioned zero-phase reactor L1 is provided. Accordingly, the high-frequency current that arrives from the loading device side is effectively absorbed. More specifically, the high-frequency current is filtered by the second capacitor C5 and zero-phase reactor L1. In particular, since the high-frequency current propagates through the phase lines in a state of non-equilibrium, it is produced as a zero-phase component. This zero-phase component is absorbed by the cut core 7 in the zero-phase reactor section 10 of zero-phase reactor L1. Preferably, the capacitance of each of the second capacitors C5 is 3.3 $\mu$F, and the inductance of the zero-phase reactor is 1 mH. Thus, according to the high-frequency noise absorbing circuit of the present invention, a generated high-frequency current is first shorted to ground by the first capacitors C3, C4, next is shorted between phases by the second capacitors C5, and then is completely absorbed by the zero-phase reactor L1.

Figure 3:
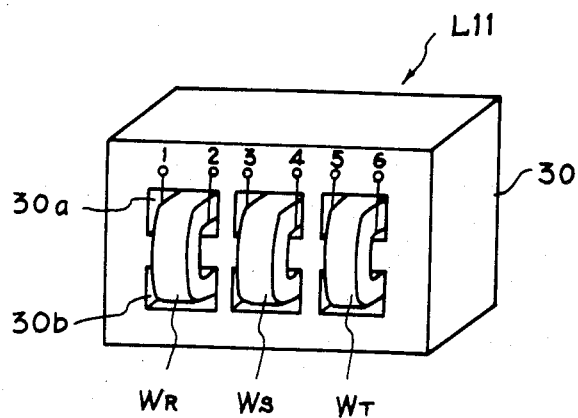
FIG. 3 is a perspective view illustrating another embodiment of a zero-phase reactor.
Figure 2:
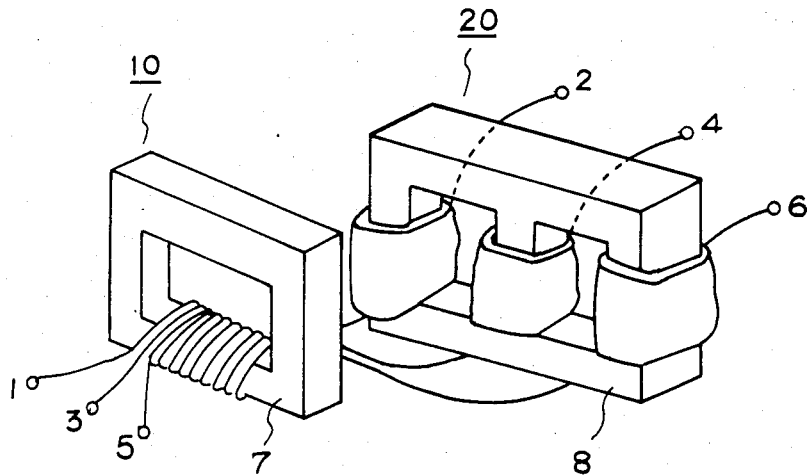

FIG. 3 is a perspective view illustrating another embodiment of a zero-phase reactor. A zero-phase reactor L11 according to the present embodiment is composed of the zero-phase reactor section 10 and AC line reactor section 20 of the zero-phase reactor L1 shown in FIGS. 2(a), (b), but here these sections are integrated. Specifically, the zero-phase reactor L11 is composed of a ferrite core 30 having three window pairs 30a, 30b, and windings $W_R$, $W_S$, $W_T$ wound on the core 30 between the windows in each pair. The power supply lines 1, 3, 5 of these windings are connected to the electromagnetic contactor of the control circuit shown in FIG. 1, and the respective output lines 2, 4, 6 are connected to the second capacitors C5. Since the zero-phase reactor according to this embodiment has the integrated core construction, parts are fewer and the structure is simpler and more compact in comparison with the arrangement of FIG. 2.

Figure 4:
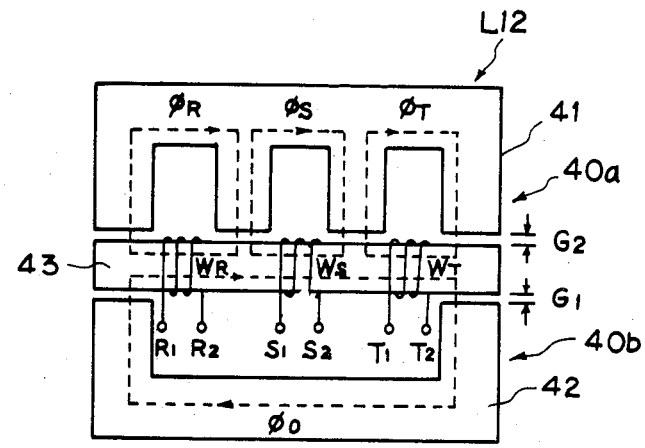
Figure 5:
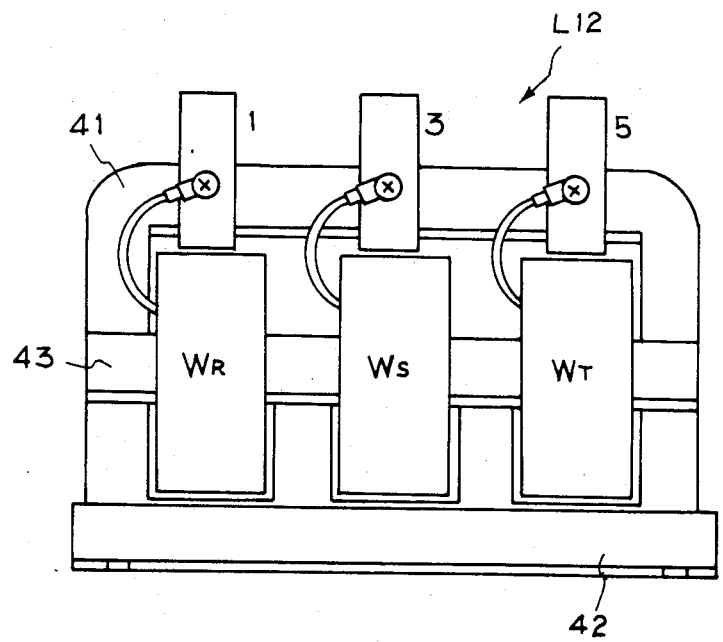
Figure 6:
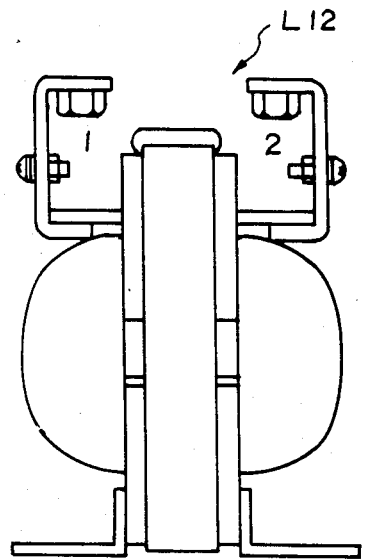

FIGS. 4 through 6 illustrate a further embodiment of a zero-phase reactor. FIG. 4 is a view for describing the construction and principle of the zero-phase reactor, and FIGS. 5 and 6 are front and side views thereof, respectively. A zero-phase reactor according to the present embodiment has a rod-shaped ferrite core 43 arranged between an interdigitated cut core 41 having a plurality of leg portions and a U-shaped core or ferrite core 42. Wound on the ferrite core 43 are windings $W_R$, $W_S$, $W_T$ connected to the terminals of respective AC phases on the input side or on the power supply side and output side. FIGS. 5 and 6 show the structure obtained by integrating an AC reactor section 40a and zero-phase reactor section 40b of the zero-phase reactor L12 shown in FIG. 4. When currents flow into the windings $W_R$, $W_S$, $W_T$, magnetic fluxes in three phases $\phi_R$, $\phi_S$, $\phi_T$ passing through the cut core 41 and ferrite core 43 are generated, and a magnetic flux $\phi_O$ of a zero-phase component passing through the cut core 40b and ferrite core 43 is generated. In other words, the ferrite core 43 serves as a path for the flux in each phase, as well as a path for the zero-phase flux. The inductance of the zero-phase reactor L12 of this embodiment is adjusted by adjusting the gap between the cut cores 41, 42 and the ferrite core 43. Ordinarily, the inductance on the side of the AC reactor 40a has a magnitude which is a fraction of the inductance on the side of the zero-phase reactor 40b. Therefore, the ferrite core 43 is arranged in such a manner that the gap $G_2$ between the cut core 41 and ferrite core 43 is larger than the gap $G_1$ between the cut core 42 and the ferrite core 43, namely in such a manner that $G_2 > G_1$ holds. Preferably, the inductance of the AC reactor section 40a is 0.1–0.2 mH, and the inductance of the zero-phase reactor section 40b is 1–2 mH. This will be ideal for absorbing a high-frequency noise component of 500 kHZ–2 MHz. The three-phase windings $W_R$, $W_S$, $W_T$ are wound on the ferrite core 43, which forms a common magnetic circuit, and shunting is effected from the common magnetic circuit to the cut core 41 forming the AC reactor and to the cut core 42 forming the zero-phase reactor.

Thus, the zero-phase reactor L12 of this embodiment is formed by integrating the AC reactor section 40a and the zero-phase reactor section 40b for high-frequency noise absorption. This makes it possible to reduce facility cost, simplify the apparatus and reduce its size.

Figure 7:
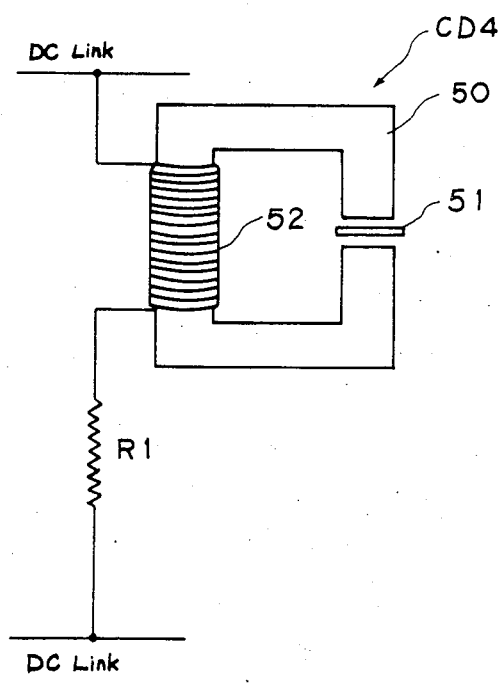
FIG. 7 is a view showing the construction of a voltage detecting device used in the control circuit.

FIG. 7 is view showing the details of the voltage detecting device comprising the voltage detector CD4 and discharge resistor R1 provided in the DC link section III of FIG. 1. When controlling the induction motor IM by means of the control circuit of the type shown in FIG. 1, the voltage of the DC link section III is detected and the induction motor IM enters the regenerative mode based on the detected voltage. When this occurs, the regenerative circuit is turned on and off to protect the induction motor. In detecting the voltage of the DC link section III, the conventional arrangement is such that the detected voltage is obtained via lead wires from both ends of an element such as a resistor or capacitor provided between the lines of the DC link section III. Thus, when obtaining the voltage of the DC link section III, the voltage is extracted in a state where it is not electrically insulated from the element connected between the lines of the DC link section. In other words, since the voltage is extracted in the conventional voltage detection method without being insolated from the main circuitry, noise is extracted, passes through the circuitry and leaks to the outside. In addition, it is required that the electrical insulation on the detection side be maintained just as on the main circuit side, namely on the side of the heavy current circuit. Furthermore, when performing maintenance and management, precautions similar to those demanded by the heavy current circuit are necessary. Failing to take these precautions can result in electric shock and leakage current accidents or in damage to the equipment.

The voltage detecting device of the present embodiment is adapted so that, in detecting the voltage of the DC link section III controlling the induction motor IM, the DC link voltage can be detected in a form where it is insulated from the main circuitry.

The voltage detecting device of the present embodiment will now be described in conjunction with FIG. 7. The voltage detecting device is composed of the voltage detector CD4 provided between the positive and negative lines of the DC link section III, and the discharge resistor R1 connected in series with the voltage detector. The voltage detector CD4 comprises a cut core 50, a Hall device arranged between both end portions of the cut core 50, and a winding 52 wound around the cut core for applying a magnetic field to the Hall device 51. The winding 52 has from several hundred to several thousand turns wound around the cut core 50. The above-mentioned discharge resistor R1 having a resistance of 10 KΩ an output of 20 W is connected in series with the winding 52. Conventionally, a Hall device is adapted to produce an output corresponding to a magnetic field. The magnetic field is generated by disposing one or two turns of a winding, through which a current is passed, on a cut-core, the field generated corresponding to the current. In other words, a Hall device ordinarily is used as a current detector. In the voltage detecting device of the present embodiment, the winding 52, which applies a magnetic field to the Hall device 51 of the voltage detector DC4, and the discharge resistor R1, which is in series with the winding 52, are connected between the lines of the DC link section III, whereby an output voltage proportional to the line voltage of the DC link section III is delivered by the Hall device 51. Thus, by arranging a Hall device, which is conventionally used as a current detector, to serve as a voltage detector, the detected voltage of the DC link section III is obtained and readily extracted while insulated from the main circuitry.

The operation of the voltage detecting device of the present invention will now be described.

When a voltage is applied across the lines of the DC link section III, a potential difference develops between the winding 52 of the output detector CD4 and the discharge resistor R1, so that a current flows into the winding 52. The winding 52 consists of, e.g., 2000 turns, and is connected in series with the discharge resistor R1, the latter constituting a high resistance of 10 KΩ. Accordingly, the line voltage of the DC link section III corresponds linearly to the output voltage of the Hall device 51 of voltage detector CD4. The voltage of the DC link section III therefore can be detected in a form insulated from the main circuitry. The detected voltage can be used to protect the induction motor IM from excessive voltage, or, in a case where the voltage of the DC link section III exceeds the input voltage, to drive the transistor TR1 for turning on the regenerative circuit upon sensing that the input voltage has been exceeded.

Thus, according to the voltage detecting device of the present embodiment, in detecting the voltage of the DC link section III controlling the induction motor IM, the voltage can be obtained in a form where it is insulated from the heavy current circuit of the main circuitry. This reduces leakage of noise to the outside, facilitates greatly the extraction of detected voltage, prevents electric shock and leakage current accidents on the extraction side, and facilitates maintenance and management.

Industrial Applicability

. Thus, the high-frequency noise absorbing circuit of the present invention enables high-frequency current to be effectively absorbed without using an insulating transformer. The invention is particularly well-adapted for used in induction motor control circuits.

We claim:

1. An induction motor control circuit with a power supply section and a converter circuit section for absorbing high-frequency noise, comprising:
   a power supply section including:
      three-phase input terminals;
      a zero-phase reactor connected to said three-phase input terminals, having three phrases and comprising an AC reactor section and a zero-phase reactor section absorbing a zero-phase component of the high-frequency noise; and
      capacitors connected between the three phases and shorting high-frequency current between the phases;
   a converter circuit section connected to the power supply section;

a DC link section, including capacitors connected between ground and respective positive and negative terminals at a connecting point with the converter circuit section, to pass the high-frequency noise to ground and a capacitor between the positive and negative terminals; and an invertor circuit section connected to the DC link section for supplying a load device.

2. A high-frequency noise absorbing circuit according to claim 1, wherein said zero-phase reactor comprises a ferrite core having three window pairs, and windings each wound on said ferrite core between the windows of a respective window pair.

3. A high-frequency noise absorbing circuit according to claim 2, wherein said zero-phase reactor comprises a multileg cut core having a plurality of legs, a U-shaped cut core opposite said multileg cut core, a ferrite core between the multileg cut core and the U-shaped cut core, with windings wound on said ferrite core.

4. A high-frequency noise absorbing circuit according to claim 3, further comprising a voltage detector comprising:

a series circuit including an inductance and a resistance connected across both ends of the DC link section; and a Hall effect device actuated by a magnetic flux generated by a magnetic circuit created by said inductance, said voltage detector detecting an output voltage from the DC link as a response in an output from said Hall effect device.

5. A high-frequency noise absorbing circuit according to claim 4, wherein said zero-phase reactor has an inductance of 1 mH.

6. A high-frequency noise absorbing circuit according to claim 4, wherein said capacitors in the power supply section have a capacitance of 3.3 $\mu$F.

7. A high-frequency noise absorbing circuit according to claim 4, wherein said capacitors in the DC link section have a capacitance of 0.01 $\mu$F.

* * * * *